United States Patent [19]
Lee et al.

[11] Patent Number: 6,038,924
[45] Date of Patent: Mar. 21, 2000

[54] LOW FREQUENCY SEISMIC ACCELEROMETER

[75] Inventors: George C. Lee, East Amherst; Zhong Liang, Williamsville, both of N.Y.

[73] Assignee: Research Foundation of State of New York, Albany, N.Y.

[21] Appl. No.: 08/996,386

[22] Filed: Dec. 22, 1997

[51] Int. Cl.[7] .................................................. G01P 15/09
[52] U.S. Cl. ..................... 73/514.34; 310/329; 310/333
[58] Field of Search .................. 73/514.34, 654, 73/514.36, 514.37, 862.043, 862.638, 1.38; 310/329, 333, 338, 339

[56] References Cited

U.S. PATENT DOCUMENTS

| | | | |
|---|---|---|---|
| 4,016,437 | 4/1977 | Calderara et al. | 310/8.7 |
| 4,088,027 | 5/1978 | Hernandez et al. | 73/517 B |
| 4,189,655 | 2/1980 | Bruel | 73/514.34 |
| 4,211,951 | 7/1980 | Jensen | 310/329 |
| 4,227,198 | 10/1980 | Preskitt et al. | 346/1.1 |
| 4,586,377 | 5/1986 | Schmid | 73/514.34 |
| 5,299,075 | 3/1994 | Hanks | 360/77.02 |
| 5,512,794 | 4/1996 | Kubler et al. | 310/329 |
| 5,572,081 | 11/1996 | Starck | 310/329 |
| 5,677,487 | 10/1997 | Hansen | 73/514.34 |

Primary Examiner—Hezron Williams
Assistant Examiner—Helen C. Kwok
Attorney, Agent, or Firm—Jaeckle Fleischmann & Mugel, LLP

[57] ABSTRACT

The present invention is a seismic accelerometer to measure and record low frequencies and large dynamic measurement ranges. The accelerometer comprises at least one directional piezoelectric sensing element and an integrated circuit. Each directional piezoelectric sensing element senses inertial forces applied to the accelerometer from a particular direction, X, Y or Z, and generates a force voltage signal in response to the inertial forces applied to the accelerometer. The sensitivity of each directional piezoelectric sensing element is in direct proportion to the sensitivity of the integrated circuit and the mass of a first mass. The integrated circuit system receives the force voltage signal from each directional piezoelectric sensing element and generates an output signal for each direction.

46 Claims, 7 Drawing Sheets

LOW FREQUENCY SEISMIC ACCELEROMETER

FIELD OF THE INVENTION

This invention relates to a seismic accelerometer for measuring low frequency and large dynamic measurement ranges, in particular, for measuring P-waves and S-waves in a single housing.

BACKGROUND OF THE INVENTION

Since the discovery of the piezoelectric effect, many types of mechanical-electrical measuring transducers based on this effect have been produced, in particular force and pressure transducers and accelerometers. The compactness, high rigidity and high resonant frequency of piezoelectric type accelerometers render such accelerometers excellent instruments to measure various inertial forces as disclosed in U.S. Pat. Nos. 4,227,198; 4,088,027; 5,299,075 and 4,016,437.

In U.S. Pat. No. 4,227,198, a piezoelectric accelerometer measures seismic activity caused by explosives in a mining operation. That accelerometer comprises a seismic sensor, delay circuitry, an amplifier, a comparator and a recorder. The seismic sensor generates a sensor signal in response to any seismic activity. The amplifier receives and amplifies the sensor signal. The comparator and the delay circuitry receive the amplified sensor signal. The comparator determines if sensor signal has reached a predetermined threshold. When the threshold is reached, the comparator generates a threshold signal. The recorder receives the threshold signal and turns on to record the sensor signal that will be released from the delay circuitry, otherwise the sensor signal is not recorded. Thus, the accelerometer is designed to accurately record a particular frequency range of forces.

The capability of accelerometers have been explored to measure various inertial forces. However, accelerometers have not previously been used to accurately monitor and record all frequency inertial forces by adjusting the accelerometer's sensitivity in response to the strength of inertial forces. The present invention is designed to resolve this inadequacy.

In addition to altering the sensitivity of the accelerometer, the proposed accelerometer would allow civil engineers to monitor inertial forces applied to a civil engineering structure to determine the safety of the structure.

SUMMARY OF THE INVENTION

The present invention is a seismic accelerometer to measure and record low frequencies and large dynamic measurement ranges. The accelerometer comprises at least one directional piezoelectric sensing element and an integrated circuit system. Each directional piezoelectric sensing element senses inertial forces applied to the accelerometer from a particular direction, X, Y or Z, and generates a force voltage signal whose amplitude and frequency are proportional to the amplitude and frequency of the inertial forces sensed by the accelerometer. The sensitivity of each directional piezoelectric sensing element is in direct proportion to the sensitivity of the integrated circuit and the mass of a first mass. The integrated circuit system receives the force voltage signal from each directional piezoelectric sensing element and generates an output signal for each direction. The invention has means for altering the sensitivity of the accelerometer. Upon reception of an initial, vertical P wave, the sensitivity is adjusted by mechanical or electrical means or by a combination of mechanical and electrical means. If the P wave magnitude predicts an S wave that would likely exceed the range of the accelerometer, the sensitivity is reduced so that the incident S wave will generate a force voltage signal within the operating range of the accelerometer. In one embodiment a mass attached to the accelerometer to raise its sensitivity. In response to an incident P wave the mass breaks and the sensitivity is reduced. In another embodiment an integrated circuit monitors the incident waves. When an incident wave exceeds a threshold level, the sensitivity of the accelerometer is automatically reduced to keep any following signals within its operating range.

DETAILED DESCRIPTION OF THE INVENTION

Figure 1:
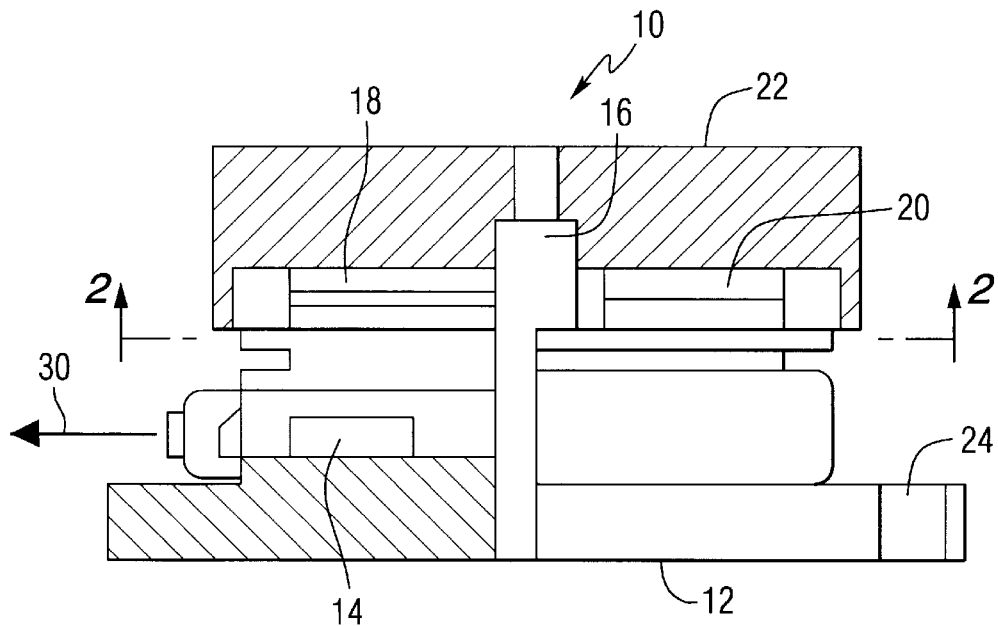
FIG. 1 is a cross-sectional view of the low frequency seismic accelerometer.

FIG. 1 is a cross-sectional view of a seismic accelerometer 10. The accelerometer 10 comprises a base 12, an integrated circuit system 14, a vertical stud 16, a first directional piezoelectric sensing element 18, a second directional piezoelectric sensing element 20, and a first mass 22.

The base 12 is a durable material, like metal or plastic, that supports the components of the accelerometer. The base 12 can have an aperture 24 so the base 12 can be connected or mounted to a civil engineering structure. The phrase "civil engineering structure" means any man-made or natural bridge, building, or structure. Extending from the center of the base 12 is the vertical stud 16. Attached to the base 12 is the integrated circuit system 14.

Figure 2:
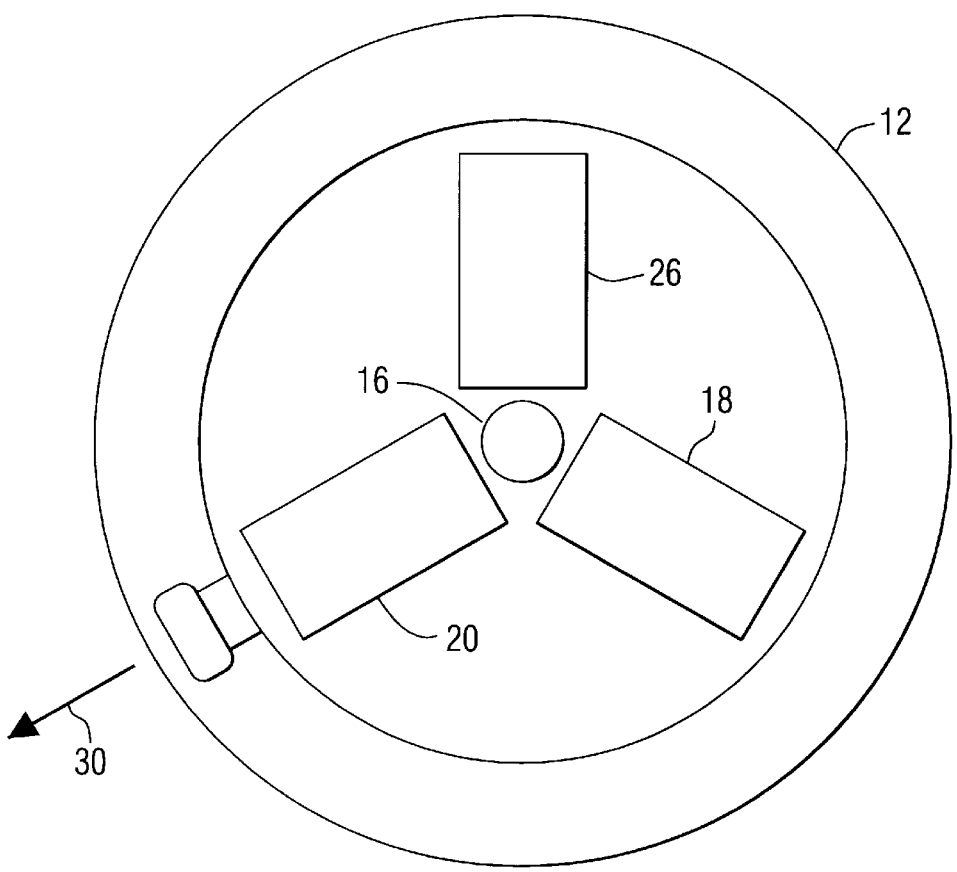
FIG. 2 is a view of FIG. 1 taken along the lines 2—2.

FIG. 2 shows a view of FIG. 1 taken along the lines 2—2. FIG. 2 shows the first piezoelectric sensing element 18, the second piezoelectric sensing element 20 and a third directional piezoelectric sensing element 26. Each sensing element 18, 20, 26 is connected to the vertical stud 16 and senses inertial forces applied to the accelerometer from a particular direction (X, Y or Z). For example, the third element 26 may sense inertial forces from the Z direction, the second element 20 may sense inertial forces from the Y direction, and the first element 18 may sense inertial forces from the X direction. The sensing elements 18, 20, 26 sense inertial forces in a particular direction due to the crystal structure of the piezoelectric material. A horizontal crystal structure predominantly senses inertial forces from the X and Y directions. While a vertical crystal structure senses inertial forces from the Z direction. Each sensing element 18, 20, 26 generates a force voltage signal 28 in response and in proportion to the respective inertial forces applied to the accelerometer, in particular to the sensing elements.

Signal 28 is a force voltage signal and contains a broad band spectrum of frequencies, i.e., high, middle and low frequencies.

Figure 3:
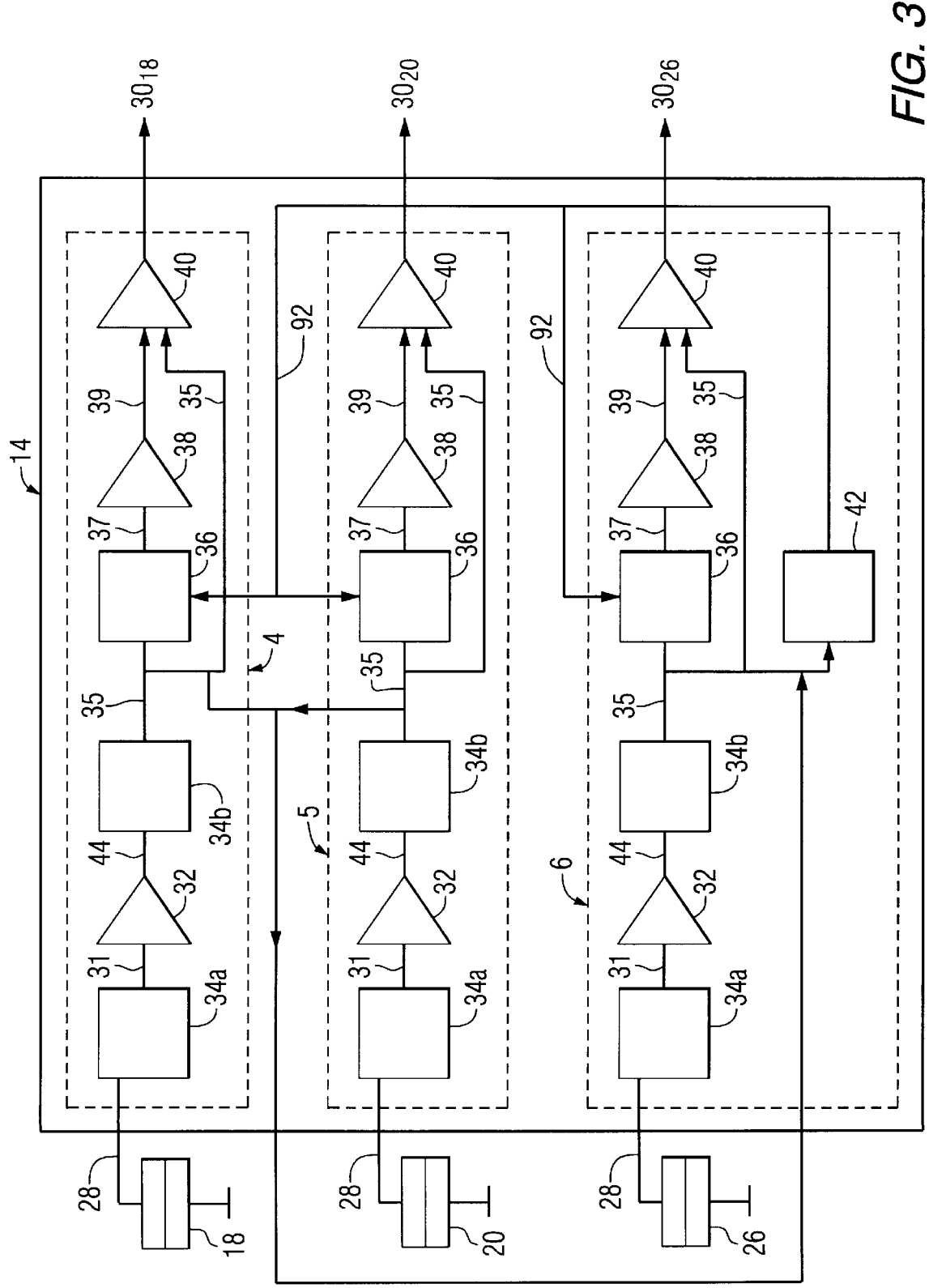
FIG. 3 is an electrical schematic of the low frequency seismic accelerometer.

FIG. 3 is an electrical schematic of the present invention. FIG. 3 shows each of the three sensing elements 18, 20, 26. Each element 18, 20, 26 generates the force voltage signal 28. Integrated circuit system 14 is comprised of three directional systems 4, 5, 6. Each directional system corresponds to one directional piezoelectric sensing element and receives the corresponding signal 28. After receiving signal 28, each directional system of the integrated circuit system 14 generates an output signal 30 for each direction (X, Y and Z).

Each directional system 4, 5, 6 comprises a first filter 34a, a pre-amplifier 32, a second filter 34b, a gate 36, a post-amplifier 38, and a comparator 40. Each directional system 4, 5, 6 is further connected to a controller 42 in integrated circuit system 14.

The first filter 34a receives the force voltage signal 28, removes the high frequency components of output 28, and generates signal 31. By removing the high frequencies, the accelerometer 10 operates in a very low frequency range, e.g. under 50 Hz. Preferably, first filter 34a is a low pass filter. The low pass filter deletes frequencies of the signal 31 greater than a desired frequency, such as 50 Hz and therefore prevents a possible overload in middle and high frequencies to any sensing element 18, 20, 26, in particular, to sensing elements designed for high sensitivity to a low frequency range. Signal 31 is similar to output 28, except signal 31 provides a low frequency spectrum.

The pre-amplifier 32 increases the sensitivity of the accelerometer 10 minutely, such as 5 V/g (Volts/acceleration due to gravity, i.e., 32 ft/sec$^2$). The pre-amplifier 32 receives the force voltage signal 28 and generates pre-amplifier signal 44. Pre-amplifier signal 44 is in voltage mode and provides the same frequency band as signal 31.

The second filter 34b for each directional system 4, 5, 6 receives its corresponding pre-amplified signal 44. The filter 34b can be either a band pass filter that filters frequencies of the signal 44 that are outside the desired frequency, such as 0.05 Hz to 50 Hz, or a low pass filter that filters frequencies of the signal 44 greater than a desired frequency, such as 50 Hz. In either option, second filter 34b generates a filter signal 35.

The controller 42 receives filter signal 35 from the vertical (z) sensor system 6 or from all three directional systems 4, 5, 6 and generates a command signal 92. Each gate 36 in integrated circuit system 14 receives command signal 92. Controller 42 determines if filter signal 35 exceeds a pre-determined threshold. When the threshold is exceeded, the controller 42 generates command signal 92 to open the gates 36. After a predetermined time period, preferably about two minutes since most earthquakes average less than 2 minutes in duration, controller 42 generates another command signal 92 to close the gates 36.

Each gate 36 receives command signal 92 and its respective filter signal 35. When gate 36 is closed, gate 36 allows filter signal 35 to pass through it. Signal 35 becomes signal 37 once it passes through gate 36. In contrast, when gate 36 is open signal 37 is not generated.

In contrast to the pre-amplifier 32, post-amplifier 38 increases the sensitivity of the accelerometer 10 dramatically, for example, from 5 V/g to 500 V/g. Post-amplifier 38 operates by receiving the signal 37 and generating an amplified signal 39 when gate 36 is closed. Comparator 40 receives signal 39 and signal 35 and generates output signal 30. Output signal 30 is signal 35 when gates 36 are open and is signal 39 when gates 36 are closed. By opening the gates 36, the sensitivity of the accelerometer 10 decreases.

Figure 4:
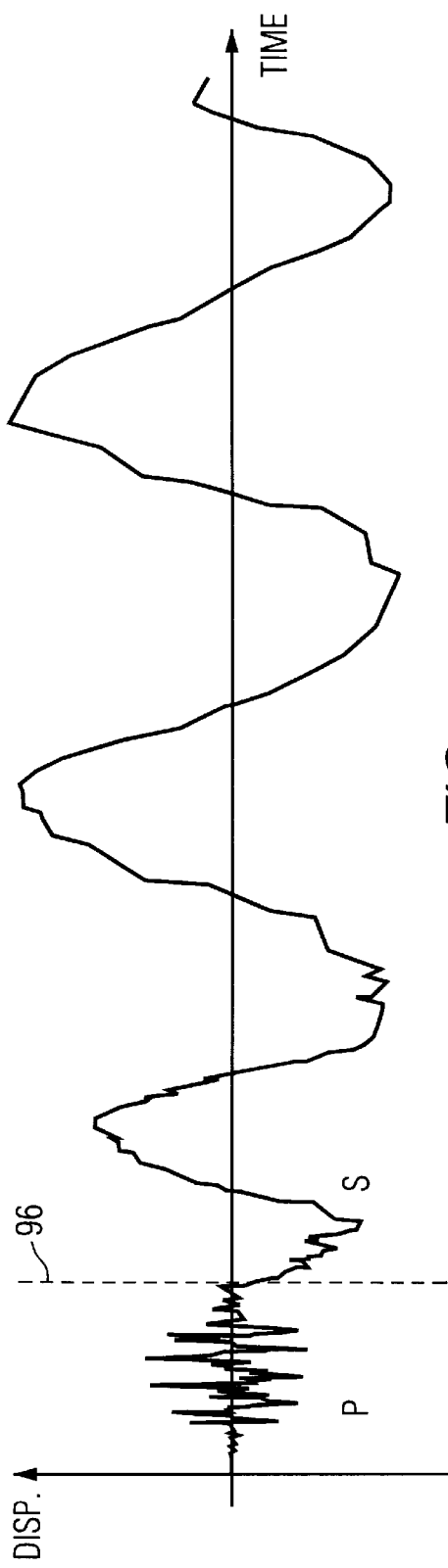
FIG. 4 is a graph of the output signals from the present invention.
Figure 5:
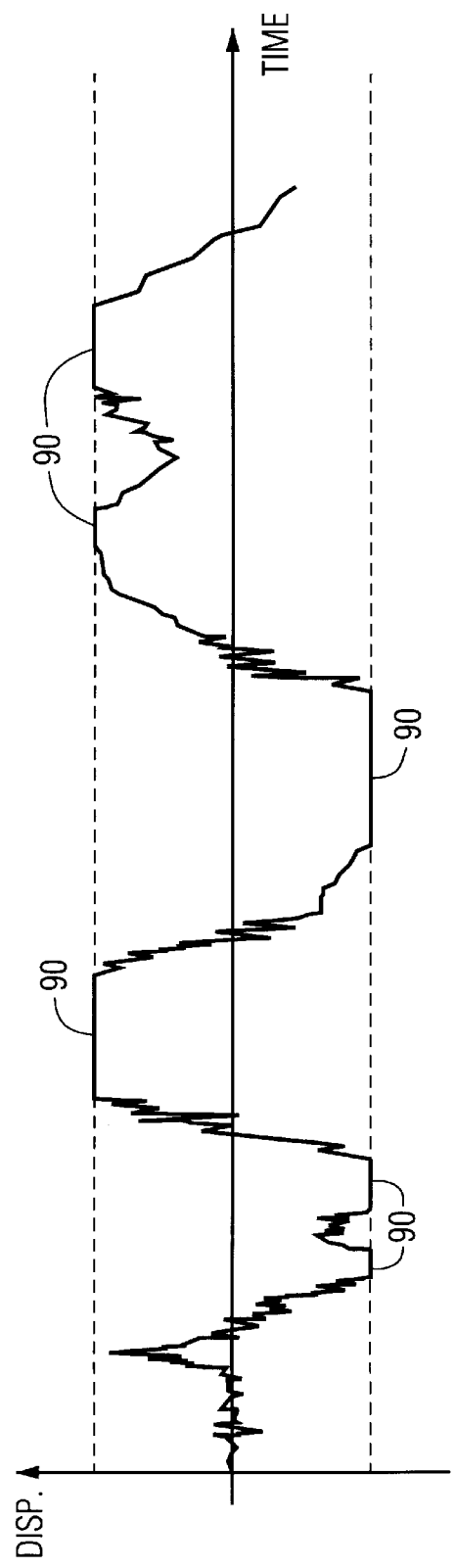
FIG. 5 is a graph of the same output signals as shown in FIG. 4 without the invention.

In operation, when a strong earthquake is sensed by the accelerometer 10 the first inertial force is normally a P-wave (vertical wave) and then a S-wave. If an inertial force, such as a P-wave, arrives and it exceeds the predetermined threshold set forth in controller 42, e.g. 0.2 g with the signal 35 being about 1 volt, then all the gates 36 receive the 1 volt signal 35 and command signal 92 from controller 42 and open. With the gate 36 of each directional system 4, 5, 6 open, the sensitivity of the accelerometer 10 decreases to the sensitivity of the pre-amplifier 32 of 5 V/g. With the lower sensitivity, the recorded output will not have any saturation points 90 on a graph as shown in FIG. 5 but will have a complete graph similar to FIG. 4 after the decrease in sensitivity of the accelerometer 10 (indicated as line 96). After the gates 36 close the sensitivity of the accelerometer 10 increases, i.e. from 5 V/g to 500 V/g, when post-amplifier 38 is in operation.

Another means to control the sensitivity of the accelerometer 10 is with the first mass 22. Returning to FIG. 1, the first mass 22 is attached to the vertical stud 16 and can be disconnected from the accelerometer 10 to alter the sensitivity of the accelerometer 10. The change in sensitivity ($S_c$) of the accelerometer 10 is directly proportional to the mass (m) of the first mass 22 and any other mass connected to the accelerometer 10, as shown by the following formula (wherein $k_c$ is a proportional coefficient):

$$S_c = k_c m$$

Figure 6:
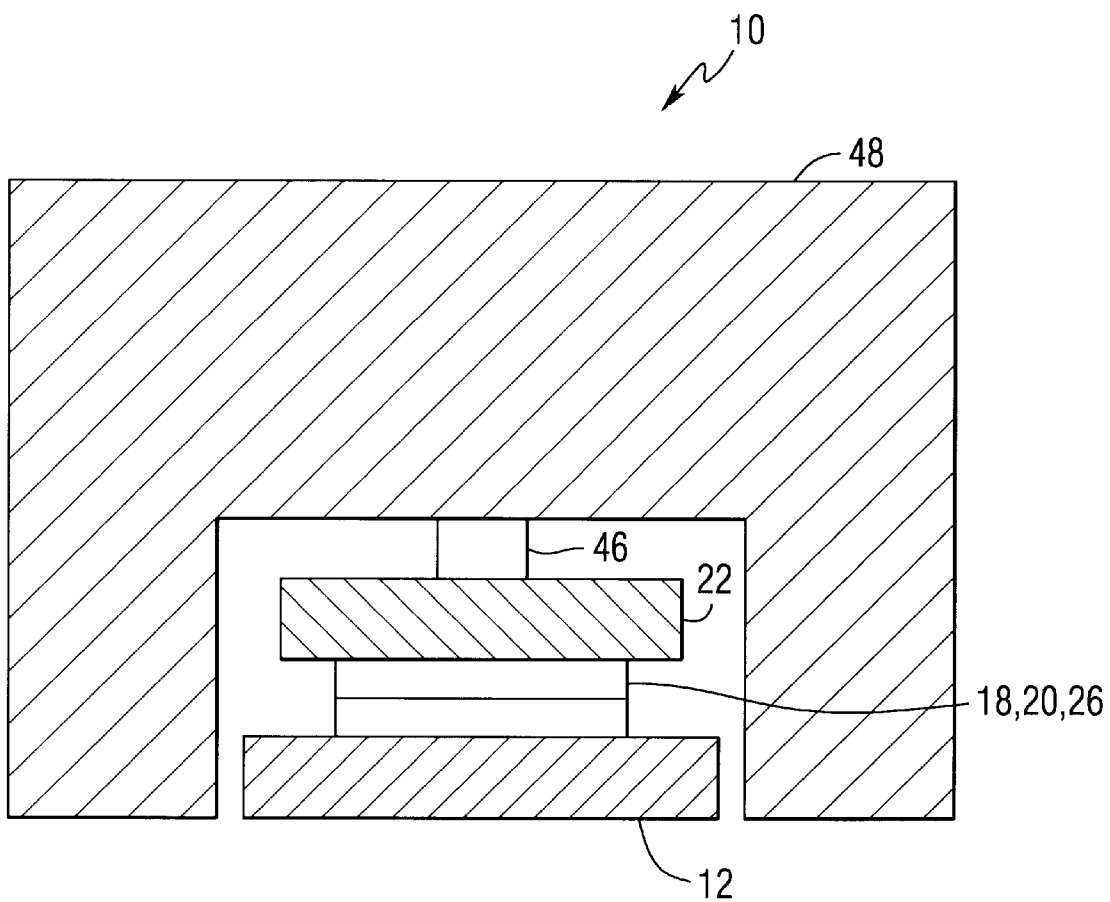
FIG. 6 is an alternative embodiment of FIG. 1.

FIG. 6 is an alternative embodiment of FIG. 1. FIG. 6 shows base 12, the three sensing elements 18, 20, 26, the first mass 22, a break mechanism 46 and a second mass 48. The break mechanism 46 is a material, such as ceramic, metal or plastic material, and is designed to break at a pre-set inertial force. The break mechanism 46 is over the first mass 22 and supports the second mass 48. The combination of the first mass 22 and the second mass 48 (m) increases the sensitivity of the accelerometer 10 proportionally, for example, 10–50 PC/g to 5000 PC/g.

If the P-wave is strong enough, the break mechanism will break and separate the second mass 48 from the accelerometer 10. Thereby, the sensitivity of the accelerometer, in particular the three sensing elements 18, 20, 26, is decreased to obtain the desired output shown in FIG. 4 rather than the output with saturated points 90 shown in FIG. 5.

Even though each sensing element 18, 20, 26 is designed to sense a particular direction of the applied inertial force, it is inherent that the sensing elements will record portions of the applied inertial force not in the particular direction (transverse forces). It is therefore necessary to cancel the transverse forces. Usually the transverse forces are functions of frequencies. That is, $$X_0(\omega) = a'_{yx}(\omega)Y_i(\omega) + a'_{zx}(\omega)Z_i(\omega)$$
$$Y_0(\omega) = a'_{zy}(\omega)Z_i(\omega) + a'_{xy}(\omega)X_i(\omega) \quad \text{Equation 1}$$
$$Z_0(\omega) = a'_{xz}(\omega)X_i(\omega) + a'_{yz}(\omega)Y_i(\omega)$$

wherein $a'_{yx}(\omega)$ stands for the influence factor to output $X_0$ from the input $Y_i$ 30 at frequency $\omega$. Equation 1 can be rewritten in the following matrix equation:

$$\begin{Bmatrix} X_o \\ Y_o \\ Z_o \end{Bmatrix} = \begin{bmatrix} 0 & a'_{yx} & a'_{yx} \\ a'_{xy} & 0 & a'_{zy} \\ a'_{xz} & a'_{yz} & 0 \end{bmatrix} \begin{Bmatrix} X_i \\ Y_i \\ Z_i \end{Bmatrix} \quad \text{Equation 2}$$

For convenience, the value $\omega$ has not been included in Equation 2.

Equations 1 and 2 can be used to cancel the transverse forces. The canceling occurs in either two manners, a variable transverse force cancellation as shown in FIG. 7 or a constant transverse force cancellation as shown in FIG. 8.

Figure 7:
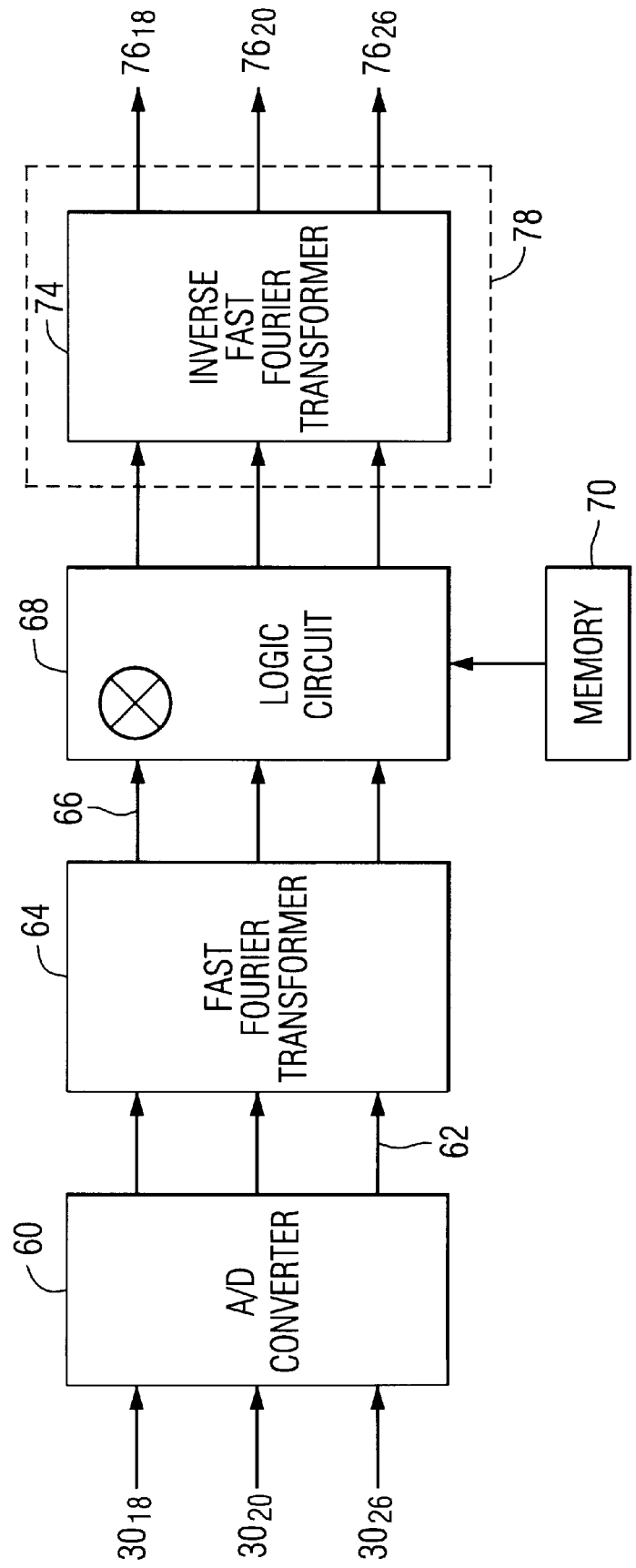
FIG. 7 is an electrical schematic to cancel variable transverse effects.

FIG. 7 illustrates an analog to digital converter 60, a fast fourier transformer 64, a logic circuit 68, a memory unit 70, an inverse fast fourier transformer 74 and an optional digital to analog converter 78 to cancel the variable transverse forces. The analog to digital converter 60 receives each output signal 30 and generates converted output signals 62 for each direction. The fast fourier transformer 64 receives converted output signals 62 and generates transformed signals 66 for each direction. The logic circuit 68 receives each transformed signal 66 and analyzes each transformed signal 66 to the other transformed signals 66 and further compares this analysis to previous data on the relation of signals 66 stored in memory unit 70 (such as an EPROM). Logic circuit 68 then alters each transformed signal 66 and generates a logic signal 72. The inverse fast fourier transformer 74 receives each logic signal 72 and generates a variable altered signal 76 for each direction (X,Y,Z). Optionally, the variable altered signal 76 can be converted by the digital to analog converter 78.

Figure 8:
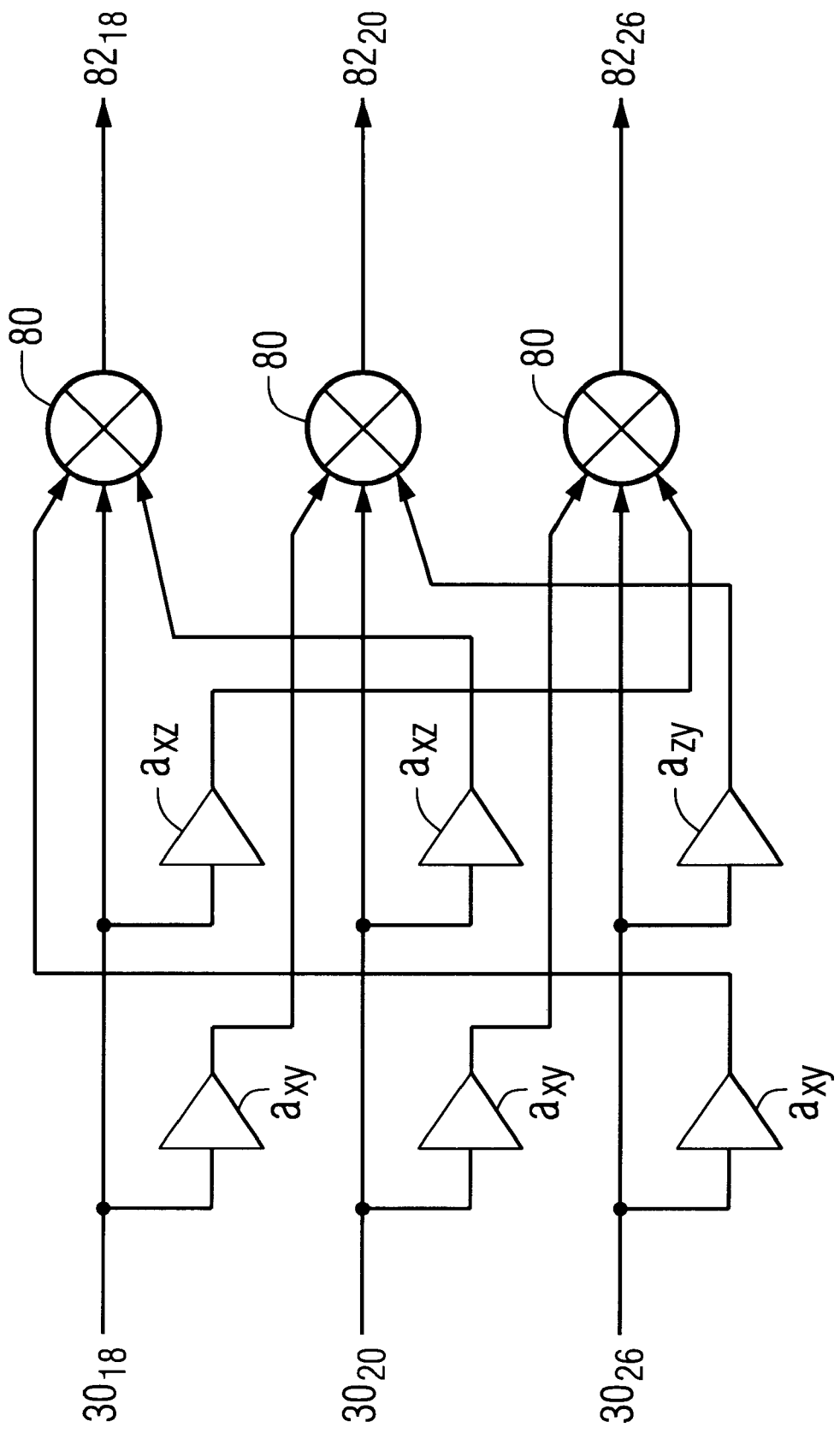
FIG. 8 is an electrical schematic to cancel constant transverse effects.

In FIG. 8, there is a logic circuit 80 for each direction to cancel the constant transverse forces. Each logic circuit 80 receives output signals 30 from each direction (X,Y,Z). Each logic circuit 80 alters each output signal 30 a pre-determined value and generates constant altered signal 82 for each direction.

Figure 9:
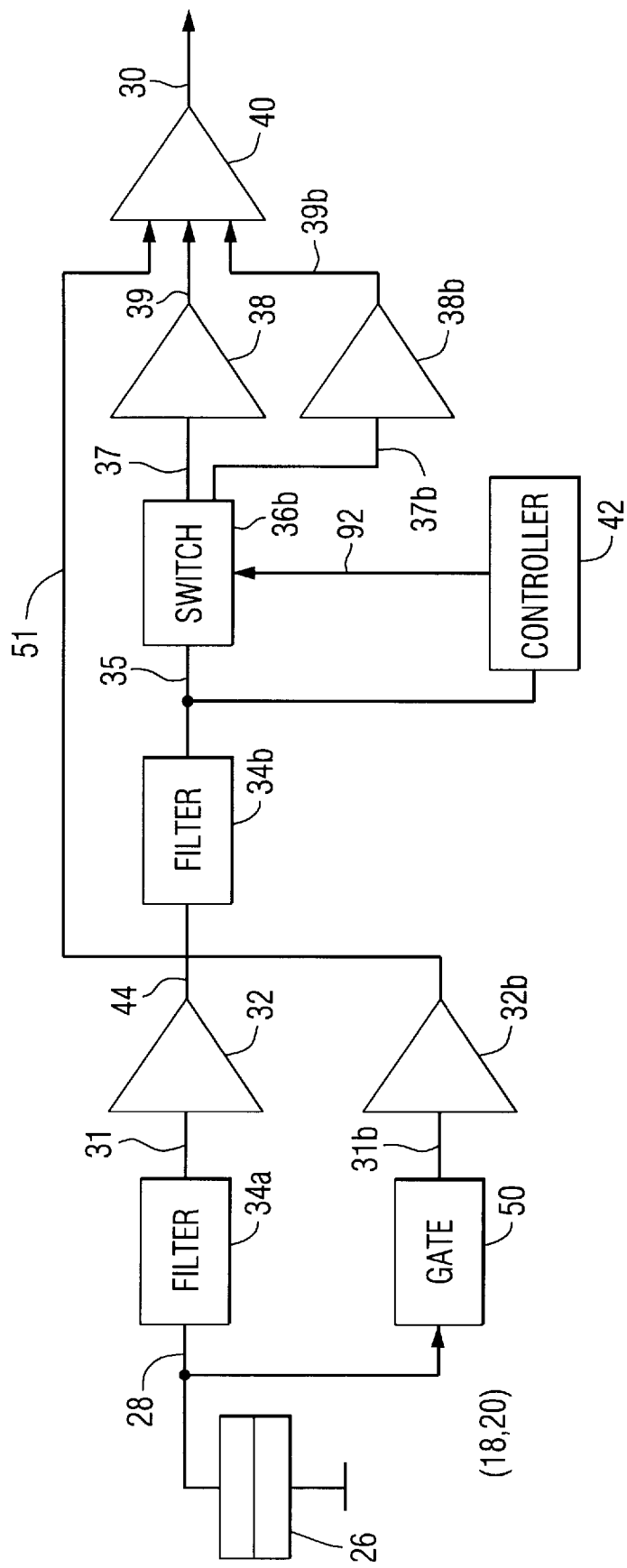
FIG. 9 is an alternative embodiment of FIG. 3.

FIG. 9 is an alternative embodiment of FIG. 3 taken from the view of box 9. In the alternative embodiment the filters 34a and 34b are by-passed through a second gate 50 to conduct a self-check mode of the accelerometer 10. The second gate 50 receives the signal 28 and directs the signal 31b to a second voltage amplifier 32b. The second voltage amplifier 32b generates a voltage signal 51 to the comparator 40. The resonant frequency of each sensing element 18, 20, 26 can be as high as a thousand hertz. Under ambient excitation, although the low frequency vibrations are in a low acceleration level, the high frequency components of the accelerometer 10 can be measured as a self-check signal to ensure the accelerometer 10 is operating properly.

Another alternative embodiment is shown in FIG. 9. Switch 36b replaces gate 36, receives signals 35 and 92, and generates signals 37 and 37b depending on the inertial force applied to the accelerometer. When signal 35 is weak, e.g. when no strong earthquake occurs, the controller 42 generates the command signal 92 that controls switch 36b to generate signal 37. Amplifier 38 receives signal 37, amplifies that signal with high gain, and generates signal 39. Comparator 40 receives signal 39.

In contrast, if signal 35 is strong, e.g. a strong P-wave signal is measured, the controller generates the command signal 92 that controls switch 36b to generate signal 37b. Amplifier 38b receives signal 37b, amplifies that signal with a much lower gain than amplifier 38, and generates signal 39b. Comparator 40 receives signal 39b.

The present invention is mounted to, for example, a bridge. An engineer is then able to monitor the inertial forces applied to that bridge to determine if that bridge is structurally sound.

Multiple units of the present invention can also be mounted to various locations on a civil engineering structure and the surrounding terrain. Each unit monitors the inertial forces applied to that structure and possible terrain and records the output in a memory unit for total analysis of the effect of an inertial force, e.g. an earthquake, on the structure.

The invention has been described in detail with particular reference to certain preferred embodiments thereof, but it will be understood that variations and modifications can be effected within the spirit and scope of the invention.

What is claimed is:

1. A seismic accelerometer for receiving incident inertial forces and generating an output signal representative of said received incident inertial forces, comprising a base having a vertical stud extending from the center of the base;

a first directional sensing element that senses incident inertial forces in the X direction, a second directional sensing element that senses incident inertial forces in the Y direction, and a third directional sensing element that senses incident inertial forces in the Z direction; each directional sensing element connected to the vertical stud and generating a force voltage signal in response to the respective incident inertial forces applied to the accelerometer; each element having a sensitivity;

a circuit that adjusts the sensitivity of the accelerometer in response to the incident inertial forces sensed by the first, second and third directional sensing elements and having three directional systems;

each directional system corresponding to one directional sensing element and receiving said force voltage signal, wherein the force voltage signal passes through at least in sequence a first filter and an amplifier, and generates an output signal for said corresponding element; and a first mass over the directional sensing elements and connected to the accelerometer;

wherein the sensitivity of the directional sensing elements are in direct proportion to the mass of the first mass and the adjustments by the circuit.

2. The seismic accelerometer of claim 1 further comprising:

a break mechanism over the first mass, and a second mass over the break mechanism; the second mass being connected to the accelerometer such that the sensitivity of the directional sensing elements is in direct proportion to the mass of the first mass and the mass of second mass when the break mechanism has not broken;

the second mass being connected to the accelerometer such that the sensitivity of the directional sensing elements is unaffected by the second mass after the second mass has broken off.

3. The seismic accelerometer of claim 2 wherein the directional sensing elements sense the incident inertial forces and if the incident inertial forces exceeds a predetermined value then the break mechanism breaks and the second mass is separated from said accelerometer to decrease the sensitivity of the directional sensing elements.

4. The seismic accelerometer of claim 1, the circuit further comprising:

gates and a controller;

the controller receiving a pre-amplified and filtered force voltage signal, so that when the pre-amplified and filtered force voltage signal exceeds a predetermined threshold, the controller generates a command signal that closes all the gates of the circuit for a predetermined time period to decrease the sensitivity of the accelerometer.

5. The seismic accelerometer of claim 1 wherein said filter is a low pass filter to ensure that a low frequency does not overload the accelerometer.

6. The seismic accelerometer of claim 1 further comprising: a second filter, wherein said second filter is a band pass filter that receives preamplifier signals and filters frequencies outside a predetermined range.

7. The seismic accelerometer of claim 1 further comprising means for canceling variable transverse effects.

8. The seismic accelerometer of claim 1 further comprising means for canceling constant transverse effects.

9. The seismic accelerometer of claim 1 further comprising means for self-checking the functionality of the first, second and third directional sensing elements by bypassing the filters.

10. The seismic accelerometer of claim 1 wherein said incident inertial forces are a P-wave.

11. The seismic accelerometer of claim 1 wherein said accelerometer is attached to a civil engineering structure.

12. A method for measuring incident inertial forces applied to a seismic accelerometer comprising the step of:
  applying a low frequency seismic accelerometer to a civil engineering structure wherein the accelerometer has at least
    a base having a vertical stud extending from the center of the base;
    one or more directional sensing elements that sense incident inertial forces in particular direction and generates a force voltage signal in response to the respective incident inertial forces applied to the accelerometer;
    means responsive to a received incident inertial force for adjusting the sensitivity of the accelerometer;
    a circuit having at least one directional system; and
    one or more directional systems, each directional system corresponding to one directional sensing element, for receiving said force voltage signal and generating an output signal for said corresponding element;
  sensing the incident inertial forces applied to said accelerometer; and
  adjusting the sensitivity of the one or more directional sensing elements in relation to the incident inertial forces.

13. The method of claim 12 wherein an integrated circuit adjusts the sensitivity of the one or more directional sensing elements so as to decrease the sensitivity of the accelerometer, when the force voltage signal exceeds a predetermined threshold for a predetermined time period.

14. The method of claim 12 wherein the means responsive to a received incident inertial force further comprises:
  a first mass and a second breakable mass;
  the breakable mass coupled to at least the vertical stud, said breakable mass increasing the sensitivity of the accelerometer when the breakable mass is not broken from the accelerometer, and decreasing the sensitivity when the breakable mass is broken from the accelerometer;
  a break mechanism over the first mass; the second breakable mass over the break mechanism and connected to the accelerometer.

15. The method of claim 14 wherein each of the one or more directional sensing elements senses the incident inertial forces such that if the incident inertial forces exceeds a pre-determined value, the break mechanism breaks, and the second breakable mass is separated from said accelerometer to decrease the sensitivity of the directional sensing elements.

16. The method of claim 12 wherein the incident inertial forces are a P-wave.

17. The method of claim 13 further comprising the steps of recording the incident inertial forces applied to the accelerometer.

18. A seismic accelerometer for receiving incident inertial forces and generating an output signal representative of said received incident inertial forces, comprising;
  a base having a vertical stud extending from the center of the base;
  one or more directional sensing elements that sense incident inertial forces in a particular direction and generates a force voltage signal in response to the respective incident inertial forces applied to the accelerometer; said sensing element having a sensitivity;
  a first mass over the directional sensing elements and connected to the accelerometer such that the sensitivity of the directional sensing elements are in direct proportion to the mass of the first mass.

19. The seismic accelerometer of claim 18 further comprising a second mass and a break mechanism for separating the second mass from the accelerometer, wherein the one or more directional sensing elements sense the incident inertial forces and if the incident inertial forces exceeds a pre-determined value, then the break mechanism breaks and the second mass is separated from said accelerometer so as to decrease the sensitivity of the one or more directional sensing elements.

20. The seismic accelerometer of claim 18 further comprising a circuit with an input for receiving said force voltage signal generated by the one or more directional elements;
  said circuit reducing the sensitivity of the accelerometer, when the force voltage signal exceeds a predetermined threshold, for a predetermined time period.

21. The seismic accelerometer of claim 20 wherein said circuit filters frequencies of the force voltage signal greater than an adjustable threshold frequency.

22. The seismic accelerometer of claim 20 wherein said circuit filters frequencies of the force voltage signal outside the range of from near zero to a threshold frequency.

23. The seismic accelerometer of claim 18 further comprising means for canceling variable transverse effects.

24. The seismic accelerometer of claim 18 further comprising means for canceling constant transverse effects.

25. The seismic accelerometer of claim 18 further comprising means for self-checking the functionality of the directional sensing elements.

26. The seismic accelerometer of claim 18 wherein said incident inertial forces are a P-wave.

27. The seismic accelerometer of claim 18 wherein said accelerometer is attached to a civil engineering structure.

28. The seismic accelerometer of claim 18 wherein there are three directional piezoelectric sensing elements, one element designated for one particular direction.

29. A seismic accelerometer for receiving incident inertial forces and generating an output signal representative of said received incident inertial forces, comprising
  a base having a vertical stud extending from the center of the base;
  a first directional sensing element that senses forces in the X direction, a second directional sensing element that senses forces in the Y direction and a third directional sensing element that senses forces in the Z direction, each directional sensing element connects to the vertical stud and generates a force voltage signal in response to the respective forces applied to the respective sensing elements;

means responsive to a received incident inertial force for adjusting the sensitivity of the accelerometer.

30. The seismic accelerometer of claim 29 wherein the means for adjusting the sensitivity of the accelerometer comprises a breakable mass coupled to at least the vertical stud, said breakable mass for increasing the sensitivity of the accelerometer when the breakable mass is not broken from the accelerometer, and for decreasing the sensitivity when the breakable mass is broken from the accelerometer.

31. The seismic accelerometer of claim 30 further comprising circuit means for selectively reducing the force voltage signal of the sensing elements when the force voltage signal exceeds a predetermined threshold.

32. The seismic accelerometer of claim 31 wherein the circuit comprises
   a controller with a first input coupled to a reference voltage representative of a threshold incident inertial force, and a second input coupled to the force voltage signal, and a first output for generating a controlling signal;
   a gate having a control input for receiving said controlling signal for switching the gate, and a force voltage input coupled to the force voltage signal; the gate having first and second output paths; one of said output paths coupled to an amplifier for amplifying said force voltage signal more than the other path;
   a comparator with first and second inputs for receiving said first and second output paths and means for generating an output signal, said output signal being the greater of the first and second inputs.

33. The seismic accelerometer of claim 29 wherein the sensitivity of the accelerometer is automatically adjusted in accordance with the incident inertial forces received by the accelerometer.

34. The seismic accelerometer of claim 32 wherein the controller reduces the sensitivity of the accelerometer, when the force voltage signal exceeds the threshold, for a predetermined period of time.

35. The seismic accelerometer of claim 21 wherein the seismic accelerometer has a frequency range, and the threshold frequency is 50 Hz.

36. The seismic accelerometer of claim 22 wherein the filters are band pass filters with a frequency range of 0.05 to 50 Hz.

37. The seismic accelerometer of claim 29 further comprising means for canceling variable transverse effects.

38. The seismic accelerometer of claim 29 further comprising means for canceling constant transverse effects.

39. The seismic accelerometer of claim 29 further comprising means for self-checking the functionality of the first directional sensing element, the second directional sensing element, and the third directional sensing element, by passing the filters.

40. The seismic accelerometer of claim 29 wherein said incident inertial forces are a P-wave.

41. The seismic accelerometer of claim 29 wherein said accelerometer is attached to a civil engineering structure.

42. The seismic accelerometer of claim 29 wherein the means for adjusting the sensitivity of the accelerometer comprises an integrated circuit.

43. A seismic accelerometer for receiving incident inertial forces and generating an output signal representative of said received incident inertial forces, comprising:
   a first directional sensing element capable of sensing inertial forces in an X direction; said first directional sensing element generating a force voltage signal in response to inertial forces in the X direction;
   a second direction sensing element capable of sensing inertial forces in a Y direction; said second directional sensing element generating a force voltage signal in response to inertial forces in the Y direction;
   a third directional sensing element capable of sensing inertial forces in a Z direction; said third directional sensing element generating a force voltage signal in response to inertial forces in the Z direction;
   a circuit system having three directional systems corresponding to the X, Y and Z directions; the three directional systems of the circuit being an X directional system which corresponds with the X direction and the X directional sensing element, a Y directional system that corresponds with the Y direction and the Y directional sensing element, and a Z directional system that corresponds with the Z direction and the Z directional sensing element;
   the X directional system of the circuit receiving the force voltage signal in response to inertial forces in the X direction; the Y directional system of the circuit receiving the force voltage signal in response to inertial forces in the Y direction; the Z directional system of the circuit receiving the force voltage signal in response to inertial forces in the Z direction;
   the X directional system of the circuit generating an output signal for the X direction; the Y directional system of the circuit generating an output signal for the Y direction; the Z directional system of the circuit generating an output signal for the Z direction;
   the X directional system, the Y directional system, and the Z directional system connected to and controlled by a controller;
   the controller allowing the output signal for the X direction, the output signal in the Y direction, and the output signal in the Z direction to be dramatically amplified when the incident inertial forces are below a predetermined threshold value;
   the controller not allowing the output signal for the X direction, the output signal in the Y direction and the output signal in the Z direction to be dramatically amplified when the incident inertial forces are above a predetermined threshold value.

44. The accelerometer of claim 43 further comprising:
   a means for adjusting the sensitivity of the accelerometer in response to incident inertial forces.

45. A seismic accelerometer for receiving incident inertial forces and generating an output signal representative of said received incident inertial forces, comprising:
   a sensor with three directional sensing elements including
      a first directional sensing element capable of sensing inertial forces in an X direction; said first directional sensing element generating a force voltage signal in response to inertial forces in the X direction;
      a second directional sensing element capable of sensing inertial forces in a Y direction; said second directional sensing element generating a force voltage signal in response to inertial forces in the Y direction;
      a third directional sensing element capable of sensing inertial forces in a Z direction; said third directional sensing element generating a force voltage signal in response to inertial forces in the Z direction;

a breakable mass that adjust the sensitivity of the sensor in response to incident inertial forces attached to the accelerometer.

46. The method for measuring inertial forces applied to a seismic accelerometer of claim 12 wherein the accelerometer further comprises:

a directional sensing element that senses inertial forces in a X direction and generates a force voltage signal in response to the inertial forces in the X direction applied to the accelerometer;

a directional sensing element that senses inertial forces in a Y direction and generates a force voltage signal in response to the inertial forces in the Y direction applied to the accelerometer;

a directional sensing element that senses inertial forces in a Z direction and generates a force voltage signal in response to the inertial forces in the Z direction applied to the accelerometer;

the circuit having three directional systems; one directional system of the circuit corresponding to the X directional sensing element; one directional system of the circuit corresponding to the Y directional sensing element; one directional system of the circuit corresponding to the Z directional sensing element.

* * * * *